(12) United States Patent
Kolletzki

(10) Patent No.: US 8,701,044 B2
(45) Date of Patent: Apr. 15, 2014

(54) VEHICLE MULTIMEDIA SYSTEM INTERFACE

(75) Inventor: Johannes Kolletzki, Mittelsinn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1485 days.

(21) Appl. No.: 11/229,059

(22) Filed: Sep. 15, 2005

(65) Prior Publication Data

US 2008/0040685 A1 Feb. 14, 2008

(30) Foreign Application Priority Data

Sep. 15, 2004 (EP) .................................... 04021921

(51) Int. Cl.
*G06F 3/048* (2013.01)
(52) U.S. Cl.
USPC ........... 715/830; 715/716; 715/717; 715/718; 715/737; 715/763; 715/764; 715/810
(58) Field of Classification Search
USPC .......... 715/737, 716–718, 763–764, 810, 830
See application file for complete search history.

(56) References Cited

U.S. PATENT DOCUMENTS

| 5,270,689 | A | | 12/1993 | Hermann | 345/145 |
|---|---|---|---|---|---|
| 5,552,806 | A | * | 9/1996 | Lenchik | 345/156 |
| 5,912,663 | A | * | 6/1999 | Cheng | 345/184 |
| 6,005,299 | A | * | 12/1999 | Hengst | 307/10.1 |
| 6,104,399 | A | | 8/2000 | Volkel | 345/352 |
| 6,154,201 | A | * | 11/2000 | Levin et al. | 345/184 |
| 6,201,540 | B1 | * | 3/2001 | Gallup et al. | 715/764 |
| 6,448,987 | B1 | * | 9/2002 | Easty et al. | 715/834 |
| 6,587,130 | B1 | * | 7/2003 | Amari et al. | 715/810 |
| 6,650,345 | B1 | | 11/2003 | Saito et al. | 345/764 |
| 6,710,771 | B1 | * | 3/2004 | Yamaguchi et al. | 345/184 |
| 6,795,097 | B1 | * | 9/2004 | Yamaguchi et al. | 715/810 |
| 8,375,334 | B2 | * | 2/2013 | Nakano et al. | 715/848 |
| 2001/0050693 | A1 | * | 12/2001 | Nishiyama et al. | 345/811 |
| 2002/0171627 | A1 | * | 11/2002 | Noguchi et al. | 345/156 |
| 2004/0046751 | A1 | | 3/2004 | Heimermann et al. | 345/184 |
| 2004/0143372 | A1 | | 7/2004 | Taxis | 701/1 |
| 2004/0160816 | A1 | | 8/2004 | Yoo et al. | |
| 2005/0081164 | A1 | * | 4/2005 | Hama et al. | 715/830 |
| 2009/0085875 | A1 | * | 4/2009 | Inoue et al. | 345/171 |

FOREIGN PATENT DOCUMENTS

| DE | 197 28 705 A1 | 1/1999 |
|---|---|---|
| DE | 10050223 A1 | 4/2002 |
| EP | 1387243 A2 | 7/2003 |
| WO | WO 01/75579 A2 | 10/2001 |
| WO | WO 03/036455 A1 | 5/2003 |

OTHER PUBLICATIONS

Kermit Whitfield, Touch and go—Design—BMW's iDrive System, Jun. 2002, Automotive Design & Production, pp. 1-3.*
John H. Day, Can BMW's iDrive Pass Its Road Test Now, Jun. 21, 2002, Electronic Design, pp. 1-2.*
Trevor Hofmann, 2001 Audi Avantissimo Concept, Nov. 13, 2002, Concept Car, pp. 1-3.*

* cited by examiner

*Primary Examiner* — Shen (Connie) Shiau
(74) *Attorney, Agent, or Firm* — Alleman Hall McCoy Russell & Tuttle LLP

(57) ABSTRACT

Vehicle multimedia system having a display that displays at least two icons which are selectable by a user for changing a setting of the multimedia system, each icon representing one feature of the multimedia system and an operating module comprising at least one operating device for operating the multimedia system, wherein each icon shown on the display is selected by operating one operating device in a single way.

26 Claims, 5 Drawing Sheets

VEHICLE MULTIMEDIA SYSTEM INTERFACE

REFERENCE TO EARLIER-FILED APPLICATIONS

This application claims priority of European Patent Application Serial No. 04021921.4, filed Sep. 15, 2004, titled VEHICLE MULTIMEDIA SYSTEM AND METHOD FOR OPERATING A VEHICLE MULTIMEDIA SYSTEM, by inventor Johannes Kolletzki, the entirety of which is incorporated by reference into this application.

BACKGROUND OF THE INVENTION

1. Field of the Invention

This invention relates to a vehicle multimedia system and, specifically to the operation of a vehicle multimedia system.

2. Related Art

Recently, the use of multimedia systems has become common in vehicles. These multimedia systems are integrated within a single device and provide the end user with different functions. These multimedia systems normally comprise radio modules, navigation modules, a cellular telephone module and/or an audio module. All these different modules and all the features provided by the different modules have to be controlled by the end user while driving. Thus, the controlling of the different multimedia modules has to be easy to use in order not to divert the attention of the driver from driving.

Furthermore, the space in which these integrated multimedia systems are provided, is limited in vehicles, as these multimedia systems are commonly arranged within the dashboard of the vehicle. In the dashboard, however, many other control units and operating devices are installed so that the multimedia system has to be accommodated in a limited space.

The multimedia systems normally have displays that help to inform the user of information about the multimedia systems, such as the traveling route in a navigation mode, or the name of the radio station in a radio mode. When a setting of the multimedia system is to be changed, a menu structure is often provided showing the different features of the multimedia system. By operating multiple operating or control devices of an operating module of the multimedia system in different ways, the setting of the multimedia system can be changed through the menu structure. Normally, this menu structure may be entered by pressing a predetermined an operating device. However the information shown on the display is basically passive information not allowing any user interaction.

As a consequence, a need exists to provide a multimedia system in a vehicle which can be easily controlled and in which the setting of the multimedia system may be changed easily.

SUMMARY OF THE INVENTION

A multimedia system in a vehicle is provided, the multimedia system has a display displaying at least two icons which are selected by a user for changing a setting of the multimedia system, each icon representing one feature of the multimedia system. The multimedia system may further have an operating module with at least one operating device for operating the multimedia system, where each of the icons shown on the display may be selected by operating one operating device in a single way.

The icon representing different features of the multimedia system may be shown on the display may be addressed directly by operating the operating device in a single way. As a consequence, these items are directly selectable, and the setting of the multimedia system can be changed easily by selecting the icon shown on the display and by changing the function, represented by this icon. The display does not only show information, but offers direct access to the different features of the multimedia system.

As a consequence, there is no need anymore to change a setting of the multimedia system by operating different operating devices and by entering a main menu structure, in which the different features of the multimedia system are provided. By making the icons and the information relating to the icon directly accessible by operating one operating device in a single way the feature corresponding to the selected icon can be controlled easily.

The operating module may have at least one turn button, wherein the icons shown on the display are selected by turning the turn button. By turning the button all icons shown on the display that represent a certain feature of the multimedia system can be addressed and selected. Pressing one operating device of the operating module may change the value of the feature represented by an icon. The selection of the icon is confirmed by pressing the operating device. If the feature represented by the icon has only two possible values, the pressing would toggle its value.

It is also possible that the feature represented by the icon has more than two possible values. In this case, a plurality of sub-icons may be displayed on the display after a selection of one icon, the sub-icons representing the different values of the selected icon. The sub-icon can also represent the value of the icon itself, so that, when an icon is chosen, the different values are displayed. Furthermore, it is possible that sub-icons are displayed together with values. The sub-icons can either be displayed simultaneously, and one of the sub-icons can be selected by writing the turn button. However, it is also possible that only one sub-icon is displayed, and by turning the turn button the sub-icon changes representing the different values of the selected icon. If the icon selected by the user by turning the turn button represents a very complex functionality it is also possible that after pressing the operating device a menu page opens showing the different possibilities to change the values of the icon.

It may also be possible to change the value of an icon having more than two possible values by pressing a button. This means that each pressing of the button activates the next value of the icon. When the button is pressed, it is possible that the value is activated simultaneously, e.g. when scrolling the list of radio stations. However, it is also possible that the value is just activated after a certain amount of time, e.g. while changing the frequency band from the very high frequency band (VHF) to the short wave band or the middle wave band. In this situation it may be bothering that the change of frequency band is activated in the moment of pressing the button, as the driver would hear the change of frequency band. If the change of the value is just activated after a timeout, the change of the frequency band may be user-friendlier, as the frequency band is only changed after a certain amount of time in which the button is not pressed. In this case, the user does not hear each modification of the frequency band. When the operating device is not touched for a certain amount of time, it may be assumed that the value or sub-icon is activated that the user wants to choose.

It should be understood that not all items representing a feature of the multimedia system are always displayed on the display. Independence of the operating mode of the multimedia system, i.e., whether it runs in a radio mode, an audio mode, a navigation mode or a cell phone mode, the display may display different icons representing the key features of the different modules of the multimedia system. The display may display certain icons and may not display other icons. The other icons not shown on the display, and possibly also the icons shown on a display can still be edited by entering a main menu by selecting the different features of the icon by going through the menu.

The multimedia system may also have a marker which marks the selected icon and which moves from selected icon to selected icon, when the turn button is turned. By marking the selected icon, the marker helps to inform the user which icon he or she has addressed by turning the turn button. The marker may jump from icon to icon when the button is turned. The marker may mark the icon by selecting a different color for the marked icon or by choosing another background for the selected icon.

The operating module may have at least one turn press button, wherein icons shown on the display are selected by turning the turn press button, whereas pressing the turn press button changes the value of the feature of an icon. The combined turn press button may help change the setting of the multimedia system in a simple way, as this single button may be used to select the icon by turning the button and to confirm the choice and used to change the value of the icon by pressing the button.

The direct way to change the settings by making the icons directly selectable is possible, when a select mode is chosen. This select mode may be activated when a predetermined operating device is activated preferably for a predetermined amount of time. By way of example, the turn press button could be pressed for a predetermined amount of time, so that after pressing the turn press button for a predetermined amount of time the select mode is chosen, and by tuning the turn button the icons shown on the display can be addressed and selected. It may also be possible to leave the select mode by pressing a further predetermined operating device for a predetermined amount of time.

It may also be possible to choose the turn press button as predetermined operating device, especially so that when the system is working in the select mode and when the turn press button is again pressed for a predetermined amount of time the select mode is exited.

Furthermore, the marker may mark a predetermined icon as home icon after a time out in which the operating module is not operated. When the end user does not touch the operating module and no operating device is operated for a certain amount of time one predetermined icon, called home icon, is marked. By way of example, this home icon may be the icon allowing entry to the main menu that is used to change the settings of the multimedia system. When the multimedia system works in the select mode and when no operating device is operated the marker jumps back to the home icon. When the turn button is turned, the different icons shown on the display are selected.

It may also be possible to hook one icon as a selected icon so that the hooked icon will play the role of the home icon mentioned above. This may be possible when a predetermined operating device is activated, especially for a predetermined amount of time, so that the marker hooks one icon as the selected icon when the marker has marked said icon before. If the predetermined operating device is operated as described above in order to hook one icon, a pop-up menu may ask the user "hook to this icon", or may, output an audible signal after hooking has succeeded. The current hook should in some appropriate way be visible on the display. The hooking of an icon means that this icon is now the home icon. Thus, after a certain timeout the market jumps back to this home icon.

When the multimedia system is not working in the select mode, the system works in a standard mode. This standard mode, however, depends on the selected home icon, i.e. which icon was chosen as hooked icon. When the system was hooked to one icon this icon was chosen as the home icon. When the system is not working in the select mode, but in the standard mode, this means that when one icon has been chosen as the hooked icon, after a timeout the marker jumps back to the selected home icon, and the system is configured such that an editing of this icon has priority over all other operations.

This means that the operation needed to edit the icon is reserved and cannot be used in any other way. By way of example, when the options icon is chosen as home icon, then the pressing of the operating device is reserved for entering the menu. The turning of the operating device is not used for this icon and can therefore be used for selecting other icons as in the select mode. If however, the frequency icon is chosen as the home icon, then the turning of the operating device is reserved for choosing other frequencies, the operation of pressing the operating device is not used. If in this ease, the user wants to enter the select mode to select the other icons by turning the operating device, he or she has to enter the select mode, as described above, e.g. by pressing a predetermined button for predetermined amount of time.

As a consequence, the standard mode, which is also called edit mode in the present case, depends on the fact which icon has been selected as the home icon. In the standard mode, the operability of the hooked icon has priority over all other functions. In this mode the editing of the icon is carried out by operating the operating device as necessary for editing of this icon, this being the reason why the standard mode may also be called the edit mode. If an icon is chosen as a home icon, in which pressing the operating device changes the value, the function of turning the operating device is not needed in this case, so that the turning also makes a marker jump from icon to icon. In this case, a change of the operating mode into the select mode is not necessary. However, if a home icon is chosen, in which the turning is needed for editing the icon, then a change of the operating mode is necessary in order to return to the select mode, e.g. by pressing a predetermined operating device for a predetermined amount of time.

By way of example, this may be helpful when the user wants to hook the frequency icon in a radio operating mode. Every time the user is turning the operating device the frequency is changed. When the end user wants to edit another icon, he or she has to press the predetermined operating device to enter again the select mode. The user can then select another icon and edit its value.

If the display is not hooked to the edited icon, the marker will return to the hooked item after the timeout, so that when turning the operating device after a certain timeout the user will edit the hooked icon and change the frequency. In this embodiment the user can choose one icon as a preferred icon he or she wants to edit. In the case the frequency icon is the hooked icon, the user changes the frequency every time he or she is turning the operating device.

Other systems, methods and features of the invention will be or will become apparent to one with skill in the art upon examination of the following detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

Figure 1:
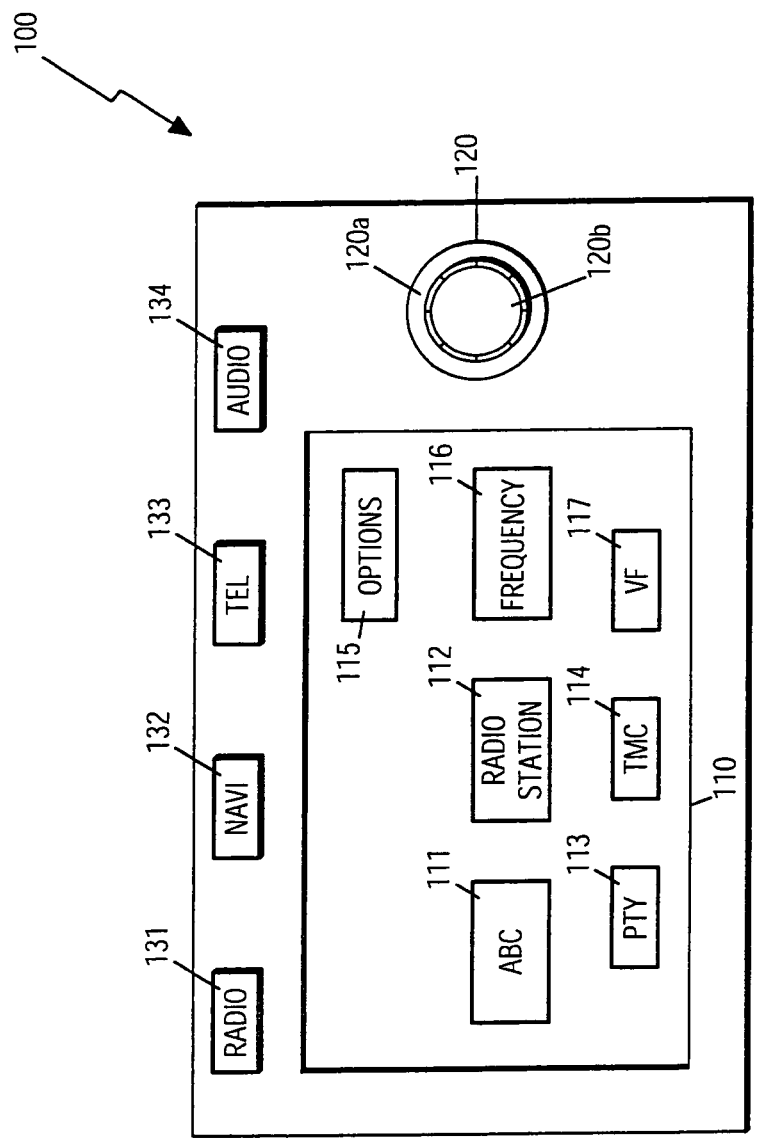
FIG. 1 shows an example of a multimedia system displaying different icons to be selected by a user.

In FIG. 1, a schematic view of a front panel of a vehicle multimedia system 100 is shown. The multimedia system 100 comprises a display 110 showing different icons 111 to 117. In the implementation shown the multimedia system 100 is working in a radio operating mode, so that the icons shown on the display 111 to 117 mainly relate to features of the radio operating mode. The multimedia system 100 may also have a combined turn press button 120.

Not shown in FIG. 1 are the internal components of the multimedia system 100. A controller is coupled to memory, the display 110, digital signal processor, RF receiver, magnetic tape reader (recorder head), laser optical reader (CD/DVD reader), satellite receiver for GPS and audio signals, cellular telephone transceiver, and the input devices, such as button 120, switches 131, 132, 133, and 134. In other implementations, other input devices may be used, such as trackballs, joysticks, buttons, dials, and touch screen displays, to name but a few examples. The controller may execute software stored in the memory in order to implement features of the multimedia system 100. The software may be entered into the memory using a one-time write process or it may be downloadable from an interface port that is not shown. Further the multimedia system 100 may be connected to the power system of the vehicle in which the multimedia system 100 resides.

The turn press button 120 may have a first ring shaped segment 102a, which is rotatably fixed to the multimedia system 100. The turn press button 120 may also have a circular shaped component 120b, on which the user can press. The different parts of the turn press button 120 may be activated independently from the other part, so that when turning the part 120a, the button 120b in the middle does not move, and when, the button 120b in the middle is pressed, the part 120a does not move.

Furthermore, buttons 131 to 134 may be provided, which may be used for directly choosing one of the possible operating modes. When the radio button 131 is pressed, the multimedia system 100 may operate in the radio operating mode, when the navigation button 132 is pressed, the multimedia system 100 may work in a navigation operating mode, when the cellular telephone button 133 is pressed, the multimedia system 100 may work in the telephone operating mode and the user can make a call. When the audio button 134 is pressed, the multimedia system 100 may work in an audio mode, in which the user can hear a cassette tape, an audio CD or any other recordable medium such as a hard disk or memory units, which can be inserted into the multimedia system 300.

It should be understood, that the multimedia system 100 might have many other operating devices, which are not shown in the implementation depicted in FIG. 1. By way of example, the multimedia system 100 may have another turn press button (possibly on the other side of the display 110) or any other type of operating device. However, their description is omitted for the sake of clarity.

With the multimedia system 100 working in a radio operating mode, the icon 112 may represent the icon showing the name of the radio station. Icon 111 shown on the display 110 informs the user how the radio stations are stored in a list of radio stations that the receiver is able to receive. In the current implementation of icon 111, the letters A, B and C are shown. This icon informs the user that the different radio stations shown in icon 112 are listed in an alphabetical order, so that when icon 112 is selected, and the turn press button 120 is turned the radio station shown in icon 112 will change in an alphabetical order.

Furthermore, icon 116 shows the frequency, on which the program of the radio station is broadcast. The item 113 PTY allows the user to filter the different radio stations according to their program type. Using the PTY button 113, the user may edit the radio system in such a way that only radio stations broadcasting, news, classic music, country music, pop, etc. are used. The icon 114 represents the TMC icon (traffic message channel). With TMC the user can be informed of all the traffic information broadcast in the traffic message channel, which may be part of the broadcast signal. Icon 117 indicates that the broadcast radio station may also announce traffic news. Furthermore, icon 115 is provided to enter the main menu, in which all the possible features of the multimedia system 100 or of the radio system may be edited.

It should be understood that the display 110 might display many other icons of other items or only some of the icons shown in FIG. 1. It may also be possible to setup the display 110 by selecting the features that should be represented by an icon on the display 110. The feature of changing the setup of a displayed icon can, by way of example, be addressed by selecting the "options" icon 115 and by going through the main menu that pops up when the option icon 115 is selected and pressed.

The user may go through the main menu until the feature is reached that is used for deciding which feature should be shown on the display 110. The selection is confirmed by pressing an operating device, such as button 120b of the operating module. When the operating module is working in a select mode, the different icons shown on the display 110 can be addressed and selected by turning the combined turn press button 120. The select mode may be entered, by pressing a predetermined operating device of the operating module. It is possible to use one of the operating devices shown in FIG. 1, however, it is also possible to use any other operating device provided on, the operating module of the multimedia system 100.

When the select mode is chosen, the different icons may be addressed by turning part 120a of the turn press button 120. By way of example, icon 115, which represents the main menu, may be chosen as a home icon. When the turn press button 120 is turned the marker that marks the home icon 115 jumps from icon to icon. Independent of whether the turn press button is turned clockwise or anticlockwise the marker may jump from icon to icon in a predetermined sequence and marks the icons to be selected. To select one icon the user wants to edit, the user may turn the turn press button 120 until the icon the user wants to edit is reached. By way of example, if the user wants to change the sequence of the radio stations from an alphabetical order to an order depending on the signal quality of the received radio station, he or she may turn button 120, until icon 111 is marked. When icon 111 is marked, the marking can be confirmed by pressing part 120b of the button 120.

If the radio stations the user can select were either stored in the list in an alphabetical order or in the order of signal quality, there would be two possible values of icon 111. This means when pressing button 120, when icon 111 is marked, that the alphabetical order of the radio station will change to an order depending on the signal quality of the radio station. By pressing the button 120 the value of the icon is toggled, if there are only two possible values. The different steps explained above used for changing the order of the radio stations can be used for all icons representing two different values.

If there are three or more different possibilities for storing the radio stations in a list, then in order to select one of the orderings, the user may turn the turn press button 120 after he or she has pressed the button 120, when the icon 111 is marked. By turning the turn press button 120 the different possibilities of storing the radio stations in a list will be displayed in icon 111 one after the other. When the icon is displayed on the display 110 that the user wants to choose, the user presses button 120 to confirm the selection. However, it is also possible that pressing the button 120 changes the value. Each pressing of the button 120 could change the value either immediately or after a timeout. For each icon it can be determined in advance whether the value of the icon can be changed by turning or by pressing a button.

If the user wants to use the data from the traffic channel, the user may turn the button 120 until icon 114 is marked. If the TMC icon 114 is marked and when button 120 is pressed, the current traffic messages may be displayed. If the button 120 is pressed again the display is disabled, so that the messages are not displayed anymore. Otherwise, if the user wants to tune the radio, he or she will turn the button 120 until the icon 112 is selected. After pressing button 120 the user can turn part 120a of the button, so that the different radio stations will appear in icon 112. After a certain timeout, or after the displayed radio station is confirmed by pressing part 120b of button 120 the selected program is broadcast.

It may also be possible to directly edit the frequency. When the frequency icon 116 is selected by turning part 120a, and when part 120b of the button 120 is pressed for confirming the selection, the user may directly change the frequency by turning part 120a of button 120. When the user wants to choose a radio station broadcasting traffic message news the user will choose icon 117 and a radio station broadcasting traffic news is enabled or disabled by pressing button 120, when icon 117 is marked.

It should be understood that there are many other possibilities of displaying icons. Furthermore, many other icons could be shown on display 110. The feature represented by the icons may be edited directly as described above, or it may also be possible to edit the different features of the multimedia system 100 or to change a setting of the multimedia system 100 by entering the main menu. By way of example, entering the main menu may be possible by selecting the options icon 115. It may also be possible in another implementation to set up the display 110, i.e., to choose the number of icons shown on the display 110 by entering the main menu and by going through the menu until a feature is reached which allows to determine which icons should be shown on the display 110, and which should therefore be addressable directly by moving the marker to said icon. It also may be possible in another implementation to determine that an icon representing this feature should be shown on the display 110, so that when this icon is shown on the display 110 and this icon is selected, the user can enter a menu by pressing the button 120 which allows to determine which icons should be shown on the display 110.

Furthermore, there may exist an e-mail icon on the display 110. When an electronic mail arrives the icon may be highlighted or the user may be informed by any other audio or visual way. The user may then turn the operating device until the mail icon is reached. By pressing the operating device the mail may be displayed on the display or the multimedia system will read the message by using a text-to-speech (TTS) system incorporated into the system.

In the current implementation, the multimedia system 100 works in a radio operating mode. It will be appreciated by persons skilled in the art that when another operating mode is selected by pressing one of the buttons 131 to 134 other icons may be shown on the display 110. If an audio operating mode is chosen, the different tracks stored on the storing device such as a CD may be displayed, etc. In the telecommunication operating mode a display showing the numbers from zero to nine may be displayed, and/or an address book showing the different names may be displayed, etc. The method for editing an icon by turning the turn press button 120 for selecting an icon shown on the display 110 and by pressing the turn press button 120 to change the value or to display sub-icons or to display a submenu may be the same for all operating modes.

Figure 2:
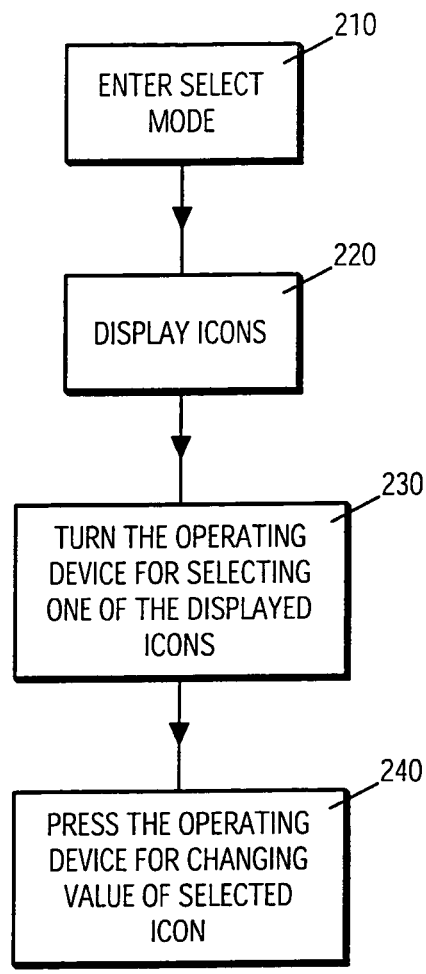
FIG. 2 shows a flowchart showing the different steps needed to change the setting of the multimedia system of FIG. 1.

Turning to FIG. 2, the different steps for a direct way to change the setting of the multimedia system 100 of FIG. 1 are shown. In a first step 210 pressing a predetermined operating device may enter the select mode. It is possible that there may be one special operating device such as a button that has to be pressed in order to enter the select mode. It is also possible that a predetermined operating device has to be pressed for a predetermined amount of time, by way of example, part 120a of the turn press button 120.

When the multimedia system 100 is working in the select mode the displayed icon displayed in step 220 may be selected by turning the operating device as it is shown in step 230. The selection made in step 230 may be confirmed by pressing the operating device for changing the value of the selected icon in step 240. Further, it may be possible that the operating devices needed in step 230 and 240 are combined in one single operating device as described in combination with FIG. 1, however, it may also be possible to use different operating devices, one that is used as a turning device, another one which is used as a pressing device.

Figure 3:
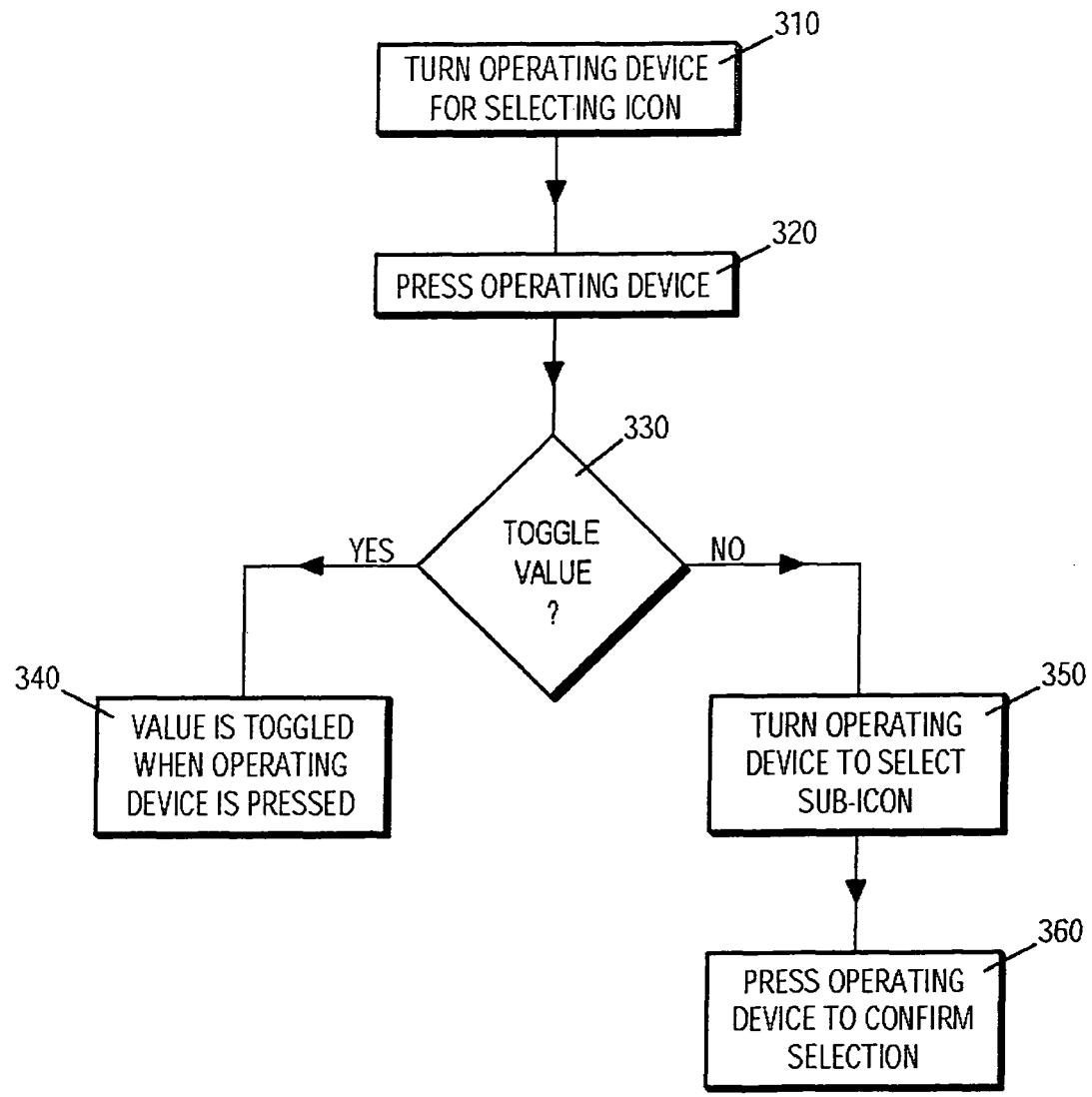
FIG. 3 shows the changing of the setting of the multimedia system of FIG. 1 in more detail.

In FIG. 3, the different steps are shown in detail, which are needed in order to change the value of a selected icon in the multimedia system 100 of FIG. 1 depending on the whether the value of the icon is changed by pressing or by turning a button. As mentioned in FIG. 2, the operating device is turned to select an icon the user wants to edit in step 310. The operating device is then pressed in step 320 to change the value of the selected icon. In step 330, a determination is made as to the value of the selected icon being changed by turning or pressing the button. If pressing the button, in step 340, may change the value of the icon then the operating device is pressed, so that the value is toggled. By way of example, these operating steps may be used, when the TMC, the PTY or the VF icon is selected as explained in conjunction with FIG. 1.

These icons in the current implementation have only two possible values, so that pressing the button can easily change these values. If it is decided in step 330 that turning the operating device can change the selected icon, the latter has to be turned one more time in step 350. In step 350, the different sub-icons may be displayed representing the different values of the icon. By way of example, if the icon wave band is selected in step 320, the different possible wave bands such as FM/MW/SW are displayed when the operating device is turned for choosing one of the displayed sub-icons. To confirm the selection, the operating device has to be pressed in step 360 when the sub-icon the user wants to choose is marked.

The decision whether the value of the icon is changed by pressing or turning the operating device may depend on the number of values of the chosen icon. If the icon has two possible values it may be preferred to change the icon by pressing the button so that the value is toggled. If there are more than two or more than three possible values, the value may be addressed by turning the operating device. However, the number of possible values needs not to be the basis for a decision whether the value is changed by turning or pressing. Other bases, such as the ergonomics of the operating device or the navigation system chosen by the designer of the multimedia system in the vehicle may be used.

Figure 4:
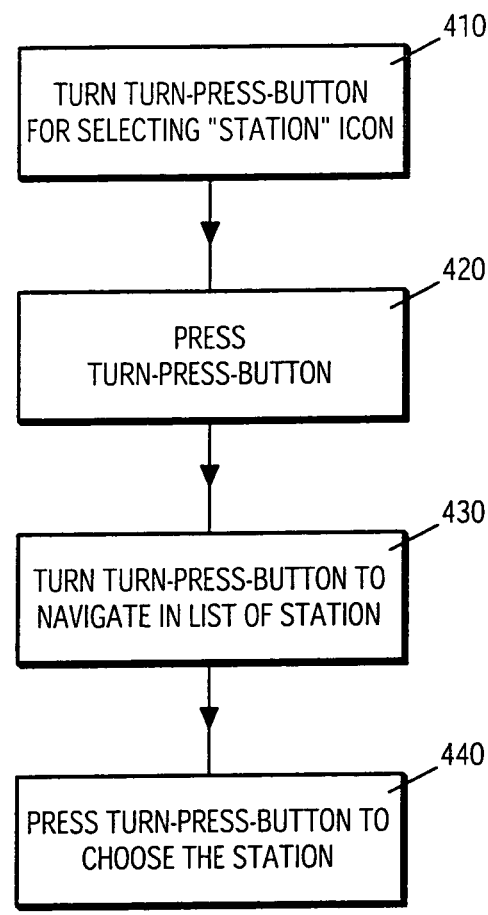
FIG. 4 shows a flowchart showing the different steps for choosing a radio station out of a list shown on the multimedia system of FIG. 1.

Turning to FIG. 4, the different steps needed to choose a predetermined radio station in the multimedia system 100 of FIG. 1 are shown in detail. When the multimedia system 100 is working in the select mode the turn press button 120 shown in FIG. 1 has to be turned until the station icon is marked in step 410. When the station icon is marked, the selection can be confirmed by pressing the turn press button 120 in step 420. The user may then turn the turn press button 120 to navigate in the list of stations.

The list of stations may either be arranged alphabetically or in dependence on the signal quality or according to any other criteria. While turning the turn press button 120 in step 430, the station icon will display the different names of radio stations one after the other. It may also be possible in other implementations, that two or three names of radio stations are displayed at the same time and that a marker jumps from one station to the other, when the turn press button 120 is turned. When the user has reached the desired radio station he or she may press the turn press button 120 to choose and confirm the selection in step 440.

Figure 5:
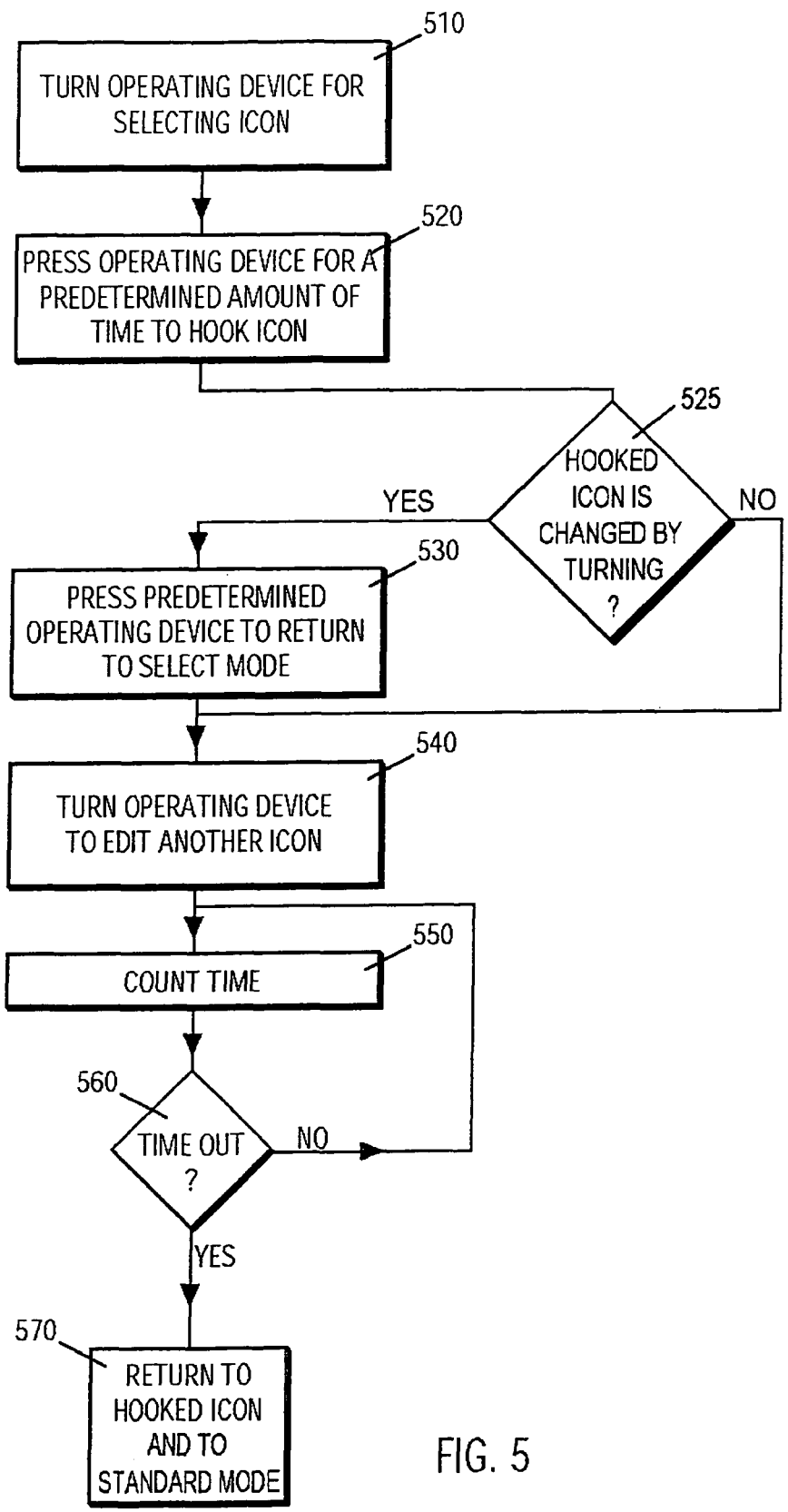
FIG. 5 shows a flowchart showing the different steps of an icon, when the system is hooked to one icon in the multimedia system of FIG. 1.

In FIG. 5, the different steps for hooking a predetermined icon in the multimedia system 100 of FIG. 1 are shown. In the multimedia system 100, it may be possible that after the operating device has not been operated for a predetermined period, the marker would jump back onto its home position. Thus, the pressing of the operating device would always open the options menu, when the options icon is chosen as a home icon, or turning the button would always move the marker from icon to icon.

According to another implementation it may be possible to hook one icon and choose this icon as home icon. This is possible by the following steps. First of all, the operating device is turned for selecting the icon that the end user wants to hook in step 510. In the next step 520, an operating device is pressed for a predetermined amount of time to hook the icon. The hooking means, that, when no other hooking has taken place, as a consequence operating the turn press button may always edit the currently hooked icon. For hooking the icon it may be possible to press a determined operating device only, or to press a predetermined operating device for a predetermined amount of time. In step 525, it is determined whether the hooked icon is edited by turning the operating device or by pressing the operating device depending on how the icon is edited as described in FIG. 3. If turning changes the value of the icon, the turning operation may not be used to select another icon (i.e. can not directly work in the select mode).

If the user wants to return to the select mode and wants to edit another icon, the user may press the operating device that he had already pressed to hook the icon. As described previously, the user either presses a predetermined operating device or presses the predetermined operating device for a predetermined amount of time to enter the select mode in step 530. In step 540, the user may then turn the operating device to move the marker within the screen to another icon. After moving the marker to another icon the user may then change or edit other icons as described in conjunction with FIGS. 1 to 4. If no other hooking has taken place, then after a timeout for which the time is counted in step 550, the multimedia system is again in the hook mode. In step 560 it is asked whether the counted time has exceeded a certain timeout. If this is the case, the system returns to the hooked item or icon and to the standard mode in step 570.

As long as the time does not exceed the timeout the marker stays at the other icon chosen in step 540, so that operating the turn press button before the timeout will edit the icon chosen in step 540. If the hooked icon is edited by pressing the operating device, the turning of the operating device ("no" in step 525) is not needed for editing an icon. A change of the operating mode as in step 530 is not necessary, another icon may be selected directly by turning the operating device as described in step 540.

After the timeout in step 560, the system returns to the hooked icon and the system returns to the standard mode or edit mode, in which an operation of the operating device will edit the hooked icon. If pressing changes the value of the hooked icon, another pressing will edit the hooked icon while a turning of the operating device will make the marker jump from icon to icon. In this case the select mode does not need to be entered by pressing an operating device in a predetermined way, as the turning for editing the hooked icon is not needed. If turning changes the value of the icon, the turning cannot be used to select the icons shown in the display 110, the user has to enter the select mode before, as described in step 530.

The steps shown in FIG. 5 help to control the multimedia system 100. When the user wants to change one icon predominantly, by way of example, the frequency in the radio operating mode or the program station itself, the user will hook the system to this icon, so that after the timeout the system will always return to the hooked icon, so that every time the user operates the operating device, he or she will edit the hooked icon.

Summarizing, the invention provides a very direct way to change the settings of a multimedia system and facilitates its operation. The display does not only display passive information, but offers direct access to the different features and to the information represented by the icon. Therefore, the handling and the controlling of a multimedia system in a vehicle become much easier, and the user is not diverted from the traffic by going through different menus.

It will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed is:

1. A method for operating a multimedia system, the method comprising:
   selecting one of a plurality of modes of operation of the multimedia system, each mode of operation having features available for selection and editing by a user as corresponding icons;
   selecting a feature of the selected mode of operation to edit by operating a selection device of the multimedia system, the selection device including a rotatable component and a depressible component;
   determining whether the selected feature of the selected mode of operation is to be edited via rotating the rotatable component or via pressing the depressible component; and
   based on the determining, editing the selected feature of the selected mode of operation by either rotating the rotatable component or pressing the depressible component.

2. The method of claim 1 where determining whether the selected feature of the selected mode of operation is to be edited via rotating the rotatable component or via pressing the depressible component includes determining a number of editable options associated with the selected feature of the selected mode of operation.

3. The method of claim 2 where, if it is determined that the number of editable options is two, editing the selected feature of the selected mode of operation includes changing the selected feature of the selected mode of operation from a first editable option to a second editable option by pressing the depressible component.

4. The method of claim 2 further including, if it is determined that the number of editable options is more than two, presenting the editable options for selection, and selecting one of the editable options by operating the selection device.

5. The method of claim 4, where selecting one of the editable options occurs in response to rotating the rotatable component and stopping the rotation.

6. The method of claim 1 where editing the selected feature of the selected mode of operation further comprises setting the selected feature of the selected mode of operation as a default feature of the selected mode of operation for the multimedia system in response to pressing the depressible component for a first determined duration of time.

7. The method of claim 6 further comprising generating an output indication that the default feature of the selected mode of operation has been set.

8. The method of claim 6 further comprising editing the default feature of the selected mode of operation by rotating the rotational component of the selection device.

9. The method of claim 8 further comprising terminating the editing of the default feature of the selected mode of operation by pressing the depressible component of the selection device.

10. The method of claim 9 where terminating the editing of the default feature of the selected mode of operation is performed in response to the depressible portion of the selection device being pressed for a second determined duration of time.

11. The method of claim 1 further comprising selecting a second mode of operation by operating the selection device.

12. The method of claim 11 further comprising changing the multimedia system to the first mode of operation after a timeout period associated with the second mode of operation.

13. The method of claim 1 further comprising editing a second feature of the selected mode of operation by determining whether the second feature of the selected mode of operation is to be edited via rotating the rotatable component of via pressing the depressible component, and based on the determining, rotating the rotatable component or pressing the depressible component.

14. A multimedia system comprising:
   a display adapted to display a plurality of selectable icons representing features of respective modes of operation of the multimedia system; and
   a selection device including a rotational portion and a depressible portion adapted to generate selection information associated with selection of the selectable icons; and
   a controller adapted to
      receive a first selection of a first feature for editing in response to operation of the selection device by a user;
      determine whether the first feature is to be edited via rotating the rotational portion or via pressing the depressible portion; and
      based on the determination, edit the first feature in response to either rotating the rotational portion or pressing the depressible portion of the selection device.

15. The multimedia system of claim 14 where the controller is further adapted to determine a number of editable options associated with the first feature.

16. The multimedia system of claim 15 where the controller is further adapted to change the first feature from a first editable option to a second editable option in response to pressing the depressible portion of the selection device when it is determined that the first feature does not have more than two editable options.

17. The multimedia system of claim 15 where the controller is further adapted to present the editable options on the display for selection when it is determined that the first feature has more than two editable options.

18. The multimedia system of claim 17 where the controller is further adapted to select one of the editable options when the rotatable portion of the selection device is stopped after it is rotated.

19. The multimedia system of claim 14 where the controller is further adapted to set the first feature as a default feature in response to pressing the depressible portion of the selection device for a first determined duration of time.

20. The multimedia system of claim 19 where the controller is further adapted to generate an output indication that the default feature has been set.

21. The multimedia system of claim 19 where the controller is further adapted to edit the default feature in response to rotating the rotational portion of the selection device.

22. The multimedia system of claim 21 where the controller is further adapted to terminate the editing of the default feature in response to pressing the depressible portion of the selection device.

23. The multimedia system of claim 22 where the controller is further adapted to terminate the editing of the default feature in response to pressing the depressible portion of the selection device for a second determined duration of time.

24. The multimedia system of claim 23 where the controller is further adapted to change to a second feature in response to again operating the rotational portion of a selection device.

25. The multimedia system of claim 24 where the controller is further adapted to edit the second feature in response to determining whether the second feature is to be edited via rotating the rotational portion or pressing the depressible portion of the selection device, and based on the determining, editing the second feature in response to rotation of the rotational portion or pressing of the depressible portion.

26. The multimedia system of claim 24 where the controller is further adapted to change to the first feature after a timeout period associated with the second feature.

\* \* \* \* \*